United States Patent [19]
Xuan et al.

[11] Patent Number: 5,783,797
[45] Date of Patent: Jul. 21, 1998

[54] LASER TEXTURING OF MAGNETIC RECORDING MEDIUM USING A CRYSTAL MATERIAL

[75] Inventors: Jialuo Jack Xuan, Milpitas; Ga-Lane Chen, Fremont; Wenjun Li, San Jose, all of Calif.

[73] Assignee: Seagate Technology, Inc., Scotts Valley, Calif.

[21] Appl. No.: 647,407

[22] Filed: May 9, 1996

[51] Int. Cl.$^6$ .................................................. B23K 26/02
[52] U.S. Cl. .......................... 219/121.69; 219/121.75; 264/400
[58] Field of Search .................... 219/121.73, 121.75, 219/121.69; 427/554, 558, 559, 596; 264/400, 409, 427, 430, 482; 425/174.4; 369/112, 44.37

[56] References Cited

U.S. PATENT DOCUMENTS

| | | |
|---|---|---|
| 3,674,340 | 7/1972 | Jacob . |
| 3,764,218 | 10/1973 | Schedewie . |
| 3,938,878 | 2/1976 | Fox . |
| 4,060,306 | 11/1977 | Swaminathan . |
| 4,139,263 | 2/1979 | Lehureau et al. . |
| 5,062,021 | 10/1991 | Ranjan et al. ........................ 360/135 |
| 5,120,927 | 6/1992 | Williams et al. ................. 219/121.69 |
| 5,128,914 | 7/1992 | Kurata et al. . |
| 5,166,006 | 11/1992 | Lal et al. . |
| 5,202,810 | 4/1993 | Nakamura et al. ..................... 360/135 |
| 5,279,775 | 1/1994 | Thomas et al. ................. 219/121.69 |
| 5,322,987 | 6/1994 | Thomas et al. ................. 219/121.68 |
| 5,402,407 | 3/1995 | Eguchi et al. . |
| 5,416,755 | 5/1995 | Endo et al. . |
| 5,498,851 | 3/1996 | Hayashi et al. ................... 219/121.75 |
| 5,550,696 | 8/1996 | Nguyen ............................... 360/135 |
| 5,582,878 | 12/1996 | Ogawa et al. .......................... 427/554 |
| 5,586,097 | 12/1996 | Nishikawa .......................... 369/44.37 |
| 5,595,768 | 1/1997 | Treves et al. ......................... 425/174.4 |

OTHER PUBLICATIONS

Baumgart et al. "A New Laser Texturing Technique for High Performance Magnetic Disk Drives," IEEE Transactions on Magnetics, vol. 31, No. 6, pp. 2946–2951, Nov. 1995.

Primary Examiner—Geoffrey S. Evans
Attorney, Agent, or Firm—Lowe, Price, LeBlanc & Becker

[57] ABSTRACT

A magnetic recording medium is provided with a surface texture generated by a pulsed laser light beam passed through a lens focusing system and then through a crystal material. The use of a crystal material enables the formation of a topography comprising precise protrusions with accurately controlled spacings therebetween.

28 Claims, 4 Drawing Sheets

LASER TEXTURING OF MAGNETIC RECORDING MEDIUM USING A CRYSTAL MATERIAL

TECHNICAL FIELD

The present invention relates to the recording, storage and reading of magnetic data, particularly rotatable magnetic recording media, such as thin film magnetic disks having textured surfaces for contact with cooperating magnetic transducer heads. The invention has particular applicability to high density magnetic recording media exhibiting low noise and having improved flying stability, glide performance and head-media interface reliability.

BACKGROUND ART

Magnetic disks and disk drives are conventionally employed for storing data in magnetizable form. Typically, one or more disks are rotated on a central axis in combination with data transducer heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk.

In operation, the magnetic disk is normally driven by the contact start stop (CSS) method, wherein the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates. The magnetic head unit is arranged such that the head can be freely moved in both the circumferential and radial directions of the disk in this floating state allowing data to be recorded on and retrieved from the surface of the disk at a desired position.

Upon terminating operation of the disk drive, the rotational speed of the disk decreases and the head begins to slide against the surface of the disk again and eventually stops in contact with and pressing against the disk. Thus, the transducer head contacts the recording surface whenever the disk is stationary, accelerated from a stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

It is considered desirable during reading and recording operations to maintain each transducer head as close to its associated recording surface as possible, i.e., to minimize the flying height of the head. This objective becomes particularly significant as the areal recording density increases. The areal density (Mbits/in$^2$) is the recording density per unit area and is equal to the track density (TPI) in terms of tracks per inch times (×) the linear density (BPI) in terms of bits per inch. Thus, a smooth recording surface is preferred, as well as a smooth opposing surface of the associated transducer head, thereby permitting the head and the disk to be positioned in closer proximity with an attendant increase in predictability and consistent behavior of the air bearing supporting the head. However, another factor operates against that objective. If the head surface and recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

In order to satisfy these competing objectives, the recording surfaces of magnetic disks are conventionally provided with a roughened surface to reduce the head/disk friction by techniques referred to as "texturing." Conventional texturing techniques involve polishing the surface of a disk substrate to provide a texture thereon prior to subsequent deposition of layers, such as an underlayer which is typically chromium or a chromium-alloy, a magnetic layer, a protective overcoat which typically comprises carbon, and a lubricant topcoat, wherein the textured surface on the substrate is intended to be substantially replicated on the surface of the magnetic disk.

A typical magnetic recording medium is depicted in FIG. 1 and comprises a substrate 10, typically an aluminum (Al)-base alloy, such as an aluminum-magnesium (Al—Mg) alloy, plated with a layer of amorphous nickel-phosphorous (NiP). Substrate 10 typically contains sequentially deposited thereon a chromium (Cr) underlayer 11, a magnetic layer 12 which is usually a cobalt (Co)-base alloy, a protective overcoat 13 which usually comprises carbon, and a lubricant topcoat 14. Cr underlayer 11, Co-base alloy magnetic layer 12 and protective carbon overcoat 13 are typically deposited by sputtering techniques. A conventional Al-alloy substrate is provided with a NiP plating primarily to increase the hardness of the Al substrate, serving as a suitable surface for polishing to provide the requisite surface roughness or texture, which is substantially reproduced on the disk surface.

The escalating requirements for high areal recording density impose increasingly greater requirements on thin film magnetic media in terms of coercivity, stiction squareness, low medium noise and narrow track recording performance. In addition, increasingly high density and large-capacity magnetic disks require increasingly small flying heights, i.e., the distance by which the head floats above the surface of the disk in the CSS drive. The requirement to further reduce the flying height of the head imposed by increasingly higher recording density and capacity render it particularly difficult to satisfy the requirements for controlled texturing to avoid head crash.

Conventional texturing techniques comprise a mechanical operation, such as polishing. See, for example, Nakamura et al., U.S. Pat. No. 5,202,810. However, conventional mechanical texturing techniques are attendant with numerous disadvantages. For example, it is extremely difficult to provide a clean textured surface due to debris formed by mechanical abrasions. Moreover, the textured surface is inevitably scratched during mechanical operations, resulting in poor glide characteristics and higher defects. In addition, various desirable substrates are difficult to process by mechanical texturing. This undesirably limiting facet of mechanical texturing virtually excludes the use of many substrates as well as conductive graphite substrates which facilitate achieving high coercivities.

In copending application Ser. No. 08/608,072 filed on Feb. 28, 1996, a sputter texturing technique is disclosed. The disclosed sputter texturing technique can be advantageously applied to a plurality of different substrates.

Another alternative texturing technique to mechanical texturing comprises laser texturing by impinging a pulsed, focused laser light beam on a layer of a magnetic recording medium, such as an upper surface of a non-magnetic substrate. See, for example, Ranjan et al., U.S. Pat. No. 5,062,021, wherein the disclosed method comprises polishing an NiP plated Al substrate to a specular finish, and rotating the substrate while directing pulsed laser energy over a limited portion of the radius, thus providing a textured landing zone leaving the data zone specular. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946-2951, November 1995. The laser texturing technique disclosed by Baumgart et al. comprises impinging a pulsed laser light beam through a single lens focusing system on a substrate surface. Baumgart et al. disclose that the shape of the protrusions is altered by adjusting the pulse energy. At low pulse energies, the bump or protrusion shape comprises a central depression and a surrounding rim, similar to that reported by Ranjan et al. As the pulse energy increases, the bottom of the depression flattens into a rounded, smooth, central dome resembling a "sombrero." At higher powers, the central dome broadens and decreases in height to eventually become equal to or lower than the rim.

A profile of a protrusion formed by the laser texturing technique as reported by Ranjan et al. is shown in FIG. 2 and comprises a substantially circular rim 23 extending above surface 21 surrounding depression 20. The depth d of depression 20 below upper surface 21 is reported by Ranjan et al. as typically about twice the rim height h.

The variation in protrusion shape reported by Baumgart et al. is shown in FIG. 3 which depicts a sequence of atomic force microscope (AFM) cross sections of protrusions created at different incident laser pulse energies in microjoules (μj).

Laser surface texturing affords an advantageous degree of control unavailable with mechanical texturing. Moreover, the accuracy of a laser light beam provides a precise delineation of the textured area boundaries, thereby enabling the accurate and reproducible formation of textured landing zones while maximizing the area available for data storage. The rounded protrusions reported by Ranjan et al. enable control of head/disk spacings while reducing friction and wear. The generally circular depressions and surrounding rims are also reported by Ranjan et al. to further reduce frictional wear by acting as areas of collection for debris and lubricant coated on the disk.

However, conventional laser texturing techniques, such as those disclosed by Ranjan et al. and Baumgart et al., suffer from several disadvantages. The geometric configuration of the topographical protrusions formed by such conventional laser texturing techniques employing a single lens focusing system result from the rapid centralized melting and thermal degradation from the center of the focused laser spot to the edge of the spot. Such single lens focusing systems generate a textured area having relatively large topographical protrusions characterized by rather abrupt local profile changes that adversely affect the flying stability and glide performance of magnetic-recording heads, and detrimentally impact the reliability of the head-medium interface. Such problematic abrupt local profile changes require greater precision in texturing a magnetic recording medium by providing a uniform pattern of laser formed protrusions smaller than those obtained by conventional laser texturing techniques.

In copending application Ser. No. 08/666,374 filed on Jun. 27, 1996, a laser texturing technique utilizing a multiple lens focusing system is disclosed for texturing a magnetic recording medium. The disclosed multiple lens focusing system enables the formation of a textured pattern comprising a plurality of controlled protrusions having a size smaller than that obtained using a single lens focusing system. In one embodiment, the laser beam is modified to provide at least two energy peaks forming at least two protrusions.

Jacob, U.S. Pat. No. 3,674,340 discloses the use of a birefringent quartz crystal in interferometry, telemetry or holography employing a laser beam. Fox, U.S. Pat. No. 3,938,878 discloses an electro-optical birefringent crystal and a light amplitude modulator between crossed polarizers. Lehureau et al., U.S. Pat. No. 4,139,263 disclose the use of a birefractive plates in a laser system for reading data from a video disk. Schedewie, U.S. Pat. No. 3,764,218 discloses the use of a birefringent crystal in the context of photolithographic edge detection.

There exist a need for a laser texturing technique which provides accurate control of the distance between laser generated protrusions of uniform height. In this way, the focused laser light beam energy profile can be controlled to enable enhanced flexibility and facilitate maintenance, thereby improving tribological and magnetic performance.

DISCLOSURE OF THE INVENTION

An object of the present invention is a method of laser texturing a magnetic recording medium, which method provides accurate control of the configuration and spacing between laser formed protrusions, thereby improving flexibility, maintenance, flying stability, glide performance and head-medium interface reliability.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a method of manufacturing a magnetic recording medium, which method comprises: texturing an upper surface of a non-magnetic substrate by passing a pulsed laser light beam through a lens focusing system and then through a crystal material spaced apart and positioned between the lens focusing system and the upper surface, so that the laser light beam passing through the crystal material has an energy profile exhibiting at least two energy peaks, thereby forming two focus points on the upper surface of the substrate.

Another aspect of the present invention is a method of manufacturing a magnetic recording medium having a plurality of sequentially formed layers on a non-magnetic substrate, which method comprises: providing an upper surface of a layer of a magnetic recording medium with a texture by passing a pulsed laser light beam through a lens focusing system and the upper surface of one of the layers, so that the pulsed laser light beam passing through the crystal material has an energy profile exhibiting at least two energy peaks, thereby forming two focus points on the upper surface of the layer, wherein the lens focusing system is a multiple lens focusing system containing a first lens and a second lens spaced apart from and positioned between the first lens and the crystal material.

Additional objects and advantages of the present invention will become readily apparent to those skilled in this art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
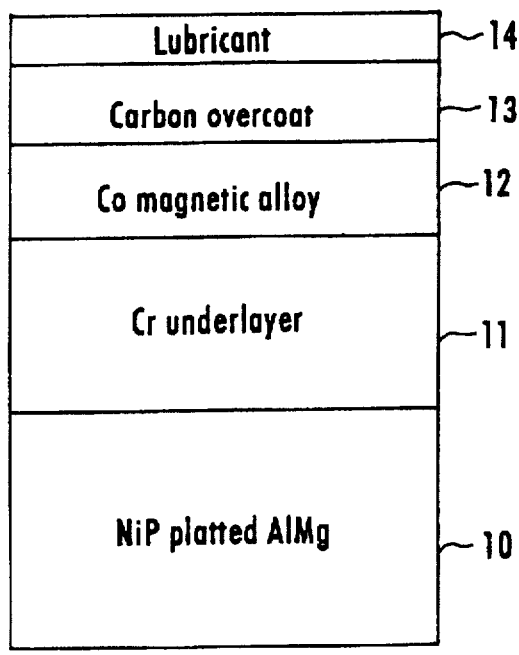
FIG. 1 depicts a conventional magnetic recording medium structure.
Figure 2:
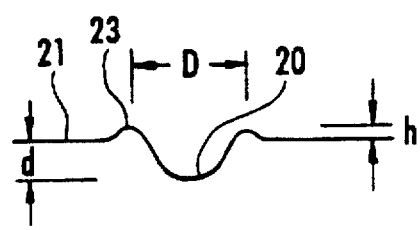
FIG. 2 is a schematic view of the profile of a protrusion formed by a conventional laser texturing technique.
Figure 3:
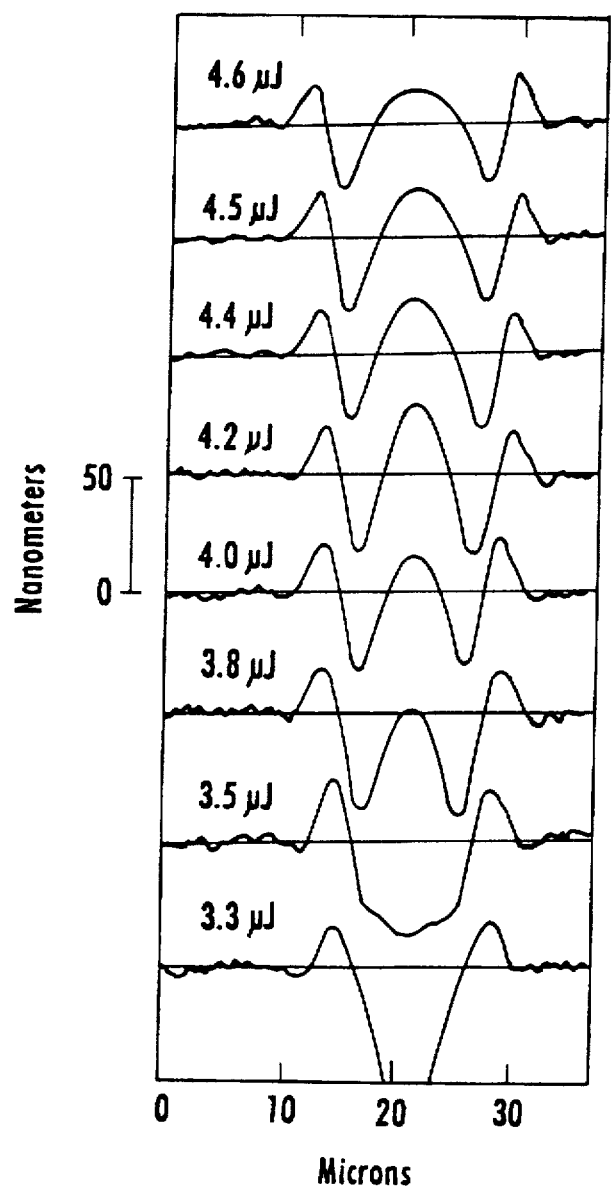
FIG. 3 demonstrates the variation in protrusion geometry as a function of laser pulse energies in accordance with a conventional laser texturing technique.

Conventional laser texturing techniques provide a magnetic recording medium with a topography, as by impinging a pulsed, focused laser light beam on an upper surface of a non-magnetic substrate. The resulting topography is intended to be substantially replicated in subsequently sequentially deposited layers, such as an underlayer, magnetic layer, protective overcoat and lubricant topcoat. A laser textured surface is generally characterized by a plurality of protrusions having a substantially circular rim surrounding a central hole or surrounding a central bump. As disclosed in copending application Ser. No. 08/666,374 filed on Jun. 27, 1996, after extensive experimentation and investigation, it was found that such laser generated protrusions exhibit abrupt profile changes, thereby adversely affecting flying stability, glide performance and head-medium interface reliability. After further extensive investigation of such abrupt profile changes, it was found that the tolerances associated with conventional laser texturing systems were inadequate to satisfy the requirements for high areal density magnetic recording media. Such abrupt profile changes are believed to stem from various sources of surface nonuniformity. For example, the substrate surface inherently contains a certain degree of waviness, apparently due to manufacturing techniques. Moreover, as a magnetic recording disk rotates, an inevitable amount of wobble occurs due to its associated disk drive. In addition, lack of surface uniformity occurs from clamping a disk during rotation. These factors adversely affect surface uniformity, thereby requiring a high degree of flexibility or tolerance during laser texturing, which flexibility and tolerance cannot be obtained with conventional laser texturing systems.

The invention disclosed in copending application Ser. No. 08/666,374 filed on Jun. 27, 1996 addresses the abrupt profile change problem by providing a laser texturing technique employing a multiple lens focusing system. The disclosed laser texturing technique, utilizing a multiple lens focusing system, enables the formation of an accurately controlled pattern of substantially uniform protrusions having a size generally smaller than that obtained employing a conventional single lens focusing system. In copending application Ser. No. 08/666,374 filed on Jun. 27, 1996, techniques are also disclosed for modifying the centralized energy profile of a laser light beam to obtain at least two energy peaks, thereby forming at least two protrusions on the upper surface of a substrate. Such techniques include offsetting the first and second lenses of the multiple lens focusing system, changing the laser mode and altering the optical train, as by interposing a mask between the laser light source and first lens. Copending application Ser. No. 08/666,374 filed on Jun. 27, 1996 is incorporated by reference herein in its entirety.

The present invention advantageously provides additional control of a laser formed texture by enabling accurate control of the distance between the laser generated protrusions, thereby providing even greater flexibility and facilitating maintenance. The present invention can advantageously be employed in combination with the laser texturing system disclosed in copending application Ser. No. 08/666,374 filed on Jun. 27, 1996.

The laser texturing technique of the present invention provides control of the polarization direction of a laser focusing system and, hence, improved control of the resulting topography. In accordance with the present invention, the distance between protrusions is controlled by controlling the polarization direction of a laser beam. In an embodiment of the present invention, the polarization direction of a laser light beam is controlled by providing a crystal material in the laser light path, as between the lens focusing system and rotating surface undergoing laser texturing. The interposition of a crystal material between the lens focusing system and rotating surface on which a pulsed, focused laser light beam impinges creates double-focus points having different energy intensities. Advantageously, the degree of separation between the focusing points is controlled by selecting a crystal material having an appropriate thickness and optical access angle. By appropriate selection of the crystal thickness and optical access angle, the final focused beam energy profile is controlled, thereby enabling accurate control of the distance between the resulting protrusions. Thus, the present invention provides increased flexibility and facilitates maintenance, thereby improving tribology and magnetic performance.

Figure 4:
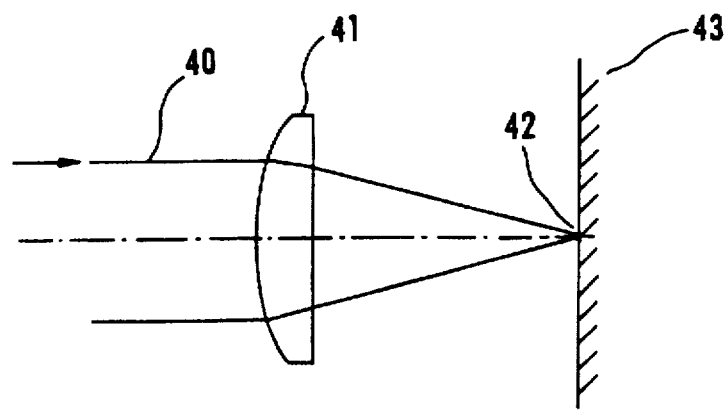
FIG. 4 schematically depicts a conventional single lens laser focusing system.

In a conventional laser texturing technique as depicted in FIG. 4, a pulsed laser light beam 40 is focused through lens 41 and impinged at a focus point 42 on the upper surface of a substrate 43. However, in accordance with the present invention, a crystal is interposed between a lens focusing system and substrate to generate double focus points having different energy intensities.

Figure 5:
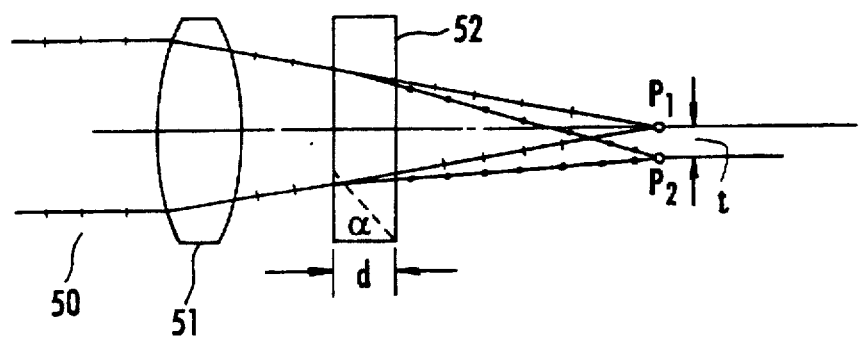
FIG. 5 schematically depicts a laser focusing system of the present invention comprising a crystal material.

An embodiment of the present invention is schematically depicted in FIG. 5, wherein pulsed laser light beam 50 is focused through lens 51. A crystal material 52, which can comprise any of various optical crystal materials, such as calcite or quartz, is interposed in the path of the pulsed, focused laser light beam. Crystal material 52 is selected to have a thickness d and a crystal-induced optical access angle α, thereby creating two focus points $P_1$ and $P_2$ having different energy intensities. Focus points $P_1$ and $P_2$ are separated by a distance t which is a function of the crystal thickness d and the crystal-induced optical access angle α. The relationship between t, d and α can be expressed by the following formula:

$$t = \{\tan[\alpha - \tan^{-1}((I_R)^2 \cdot \tan^\alpha)]\} \cdot d = f(\alpha, d)$$

wherein $I_R$ is the refractive index ratio for the particular crystal material.

Figures 6A, 6B, 6C:
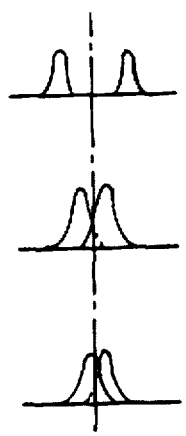
FIGS. 6A, 6B and 6C schematically depict spaced protrusions formed in accordance with the present invention.

The crystal material is selected to achieve various degrees of separation of focus points which, in turn, generate protrusions which extend above the upper surface of an exposed substrate and have a substantially circular rim around a central hole extending into the surface of the substrate. In accordance with the present invention, the particular crystal material is selected in terms of thickness and crystal-induced optical access angle α to obtain various degrees of separation between protrusions. For example, as shown in FIGS. 6A, 6B and 6C, large, medium and small, respectively, degrees of separation between protrusions can be obtained. Thus, the present invention enables accurate control of the spacings between laser generated protrusions.

The present laser texturing technique comprising the use of a crystal material can advantageously be employed in combination with the multiple lens focusing system disclosed in copending application Ser. No. 08/666,374 filed on Jun. 27, 1996. The first lens can comprise a companion doublet lens, and the second lens can comprise an aplanatic meniscus lens. Thus, a laser texture formed in accordance with the present invention employing a multiple lens focusing system advantageously exhibits optimized flying stability, glide performance and head-medium interface reliability. The use of multiple lens focusing enables the formation of a laser textured topography in which the protrusions exhibit a rim height of about 75 Å to about 300 Å, such as 150 Å to about 225 Å. The rim diameter of protrusions can range from about 3 μm to about 15 μm, such as 6 μm to about 8 μm. Protrusions can have a radius of curvature which generally ranges from 5 μm to about 200 μm, such as 40 μm to about 70 μm. The advantageous radius of curvature enables an improvement in wear resistance.

Thus, in accordance with the present invention, the benefits disclosed in copending application Ser. No. 08/666,374 filed on Jun. 27, 1996 can be achieved. In addition, greater control over the spacings between protrusions is provided by appropriate selection of a crystal material in terms of width and induced optical access angle or bending angle α.

The crystal material employed in accordance with the present invention can be any of optical crystal materials, including single crystal materials, commercially available. One having ordinary skill in the art, given the objectives and guidance disclosed herein, can easily select an appropriate crystal material of suitable thickness and bend angle, which can be specified when ordering from a supplier. Suitable crystal materials include calcite, quartz, beta barium (BBO), potassium dihydrogen phosphate (KDP), ammonium dihydrogen phosphate (ADP) and lithium niobate (LiNbO₃). Particularly suitable materials include quartz optical crystals having a dimension of 20 mm by 1.00±0.05 mm with polished faces at 45°±10° to the main access obtainable from INRAD of Northvale, N.J.

Table I sets for the various crystal materials and the separation per μm at an optical access angle of 45°.

TABLE I

| Material | $I_R$ | Split Angle (°) | Separation per μm (μm) |
|---|---|---|---|
| Calcite | 1.1102 | 5.95° | 104 μm |
| Quartz | 0.9943 | −0.33° | −6 μm |
| BBO | 1.0749 | 4.12° | 72 μm |
| LiNbO₃ | 1.0771 | 4.24° | 74 μm |
| KDP | 1.0232 | 1.31° | 23 μm |
| ADP | 1.0262 | 1.48° | 26 μm |
| LiIO₃ | 1.0813 | 4.46° | 78 μm |

The magnetic recording media produced in accordance with the present invention can comprise any of various conventional substrates employed in the production of magnetic recording media. Such conventional substrates include NiP plated Al-alloys, such as aluminum-magnesium (Al—Mg) alloys, glass, glass-ceramic materials and carbon substrates, e.g., electrically conductive graphite. A NiP plated Al—Mg alloy substrate has been found particularly suitable in the practice of the present invention.

The magnetic layers deposited in accordance with the present invention can be any of those conventionally employed in the production of magnetic recording media. Such conventional magnetic alloys, include, but are not limited to, cobalt (Co)-base alloys, such as cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtB). The thickness of the magnetic layer is consistent with conventional practices and manufacturing a magnetic recording medium. Co-base alloys having a thickness of about 100 Å to about 1000 Å, such as 200 Å to about 500 Å, has been found suitable.

As in conventional practices, an underlayer can be deposited on the textured substrate prior to depositing the magnetic layer. The underlayer can comprise Cr or a Cr-alloy, such as chromium-vanadium or chromium-titanium, oxygen-doped Cr, tungsten or a tungsten alloy.

In addition, a protective overcoat, such as a carbon overcoat, can be deposited on the magnetic layer, and a lubricant topcoat deposited on the protective overcoat. The underlayer, magnetic layers and protective overcoat can be applied in a conventional manner in conventional thicknesses, by any of various sputtering techniques employed in production of magnetic recording media.

In the embodiments disclosed infra, the laser textured topography is provided on a non-magnetic substrate, and the texture substantially replicated in subsequently sequentially deposited layers. However, a conventional underlayer, such as a Cr or Cr-alloy underlayer, or the magnetic layer itself, such as a Co-alloy magnetic layer, can be laser textured in accordance with the present invention, and the texture substantially replicated, via subsequently deposited layers, on the outer surface of the magnetic recording medium.

The present invention can be employed to produce any of various types of magnetic recording media including thin film disks, with an attendant improvement in flying stability, glide performance and head-medium interface reliability. Moreover, the precise manner in which a landing zone can be laser textured enables an increase in recording density and reduction in the size of head sliders.

Only certain embodiments of the invention and but a few examples of its versatility are shown and described in the present disclosure. It is to be understood that the invention is capable of use in various other combinations and environments and is capable of changes or modifications within the scope of the inventive concept as expressed herein.

We claim:

1. A method of manufacturing a magnetic recording medium, which method comprises:

texturing an upper surface of a non-magnetic substrate by passing a pulsed laser light beam through a lens focusing system and then through a crystal material spaced apart from and positioned between the lens focusing system and the upper surface, so that the laser light beam passing through the crystal material has an energy profile exhibiting at least two energy peaks, thereby forming two focus points on the upper surface of the substrate.

2. The method according to claim 1, comprising texturing the upper surface to form a landing zone.

3. The method according to claim 1, comprising laser texturing the upper surface to form a plurality of pairs of protrusions, each protrusions having a height and diameter less than the height and diameter of a protrusion resulting from exposing the upper surface to the laser light beam without the interposition of a crystal material between the lens focusing system and the upper surface of the substrate.

4. The method according to claim 1, further comprising depositing a magnetic layer on the laser textured substrate.

5. The method according to claim 1, comprising: depositing an underlayer on the upper surface of the substrate; and depositing a magnetic layer on the underlayer.

6. The method according to claim 5, wherein the underlayer comprises chromium or a chromium-alloy.

7. The method according to claim 1, comprising: depositing a protective overcoat on the magnetic layer; and depositing a lubricant topcoat on the protective overcoat.

8. The method according to claim 7, wherein the protective overcoat comprises carbon.

9. The method according to claim 1, wherein the substrate comprises nickel-phosphorous plated aluminum or a nickel-phosphorous plated aluminum alloy.

10. The method according to claim 1, wherein the crystal material comprises quartz or calcite.

11. The method according to claim 1, comprising passing the pulsed laser light beam through a multiple lens focusing system containing a first lens and a second lens spaced apart from and positioned between the first lens and the crystal material.

12. The method according to claim 11, wherein the first lens comprises a companion doublet lens, and the second lens is selected so that the multiple lens focusing system has a depth of focus greater than that of the first doublet lens.

13. The method according to claim 12, wherein the second lens comprises an aplanatic meniscus lens.

14. The method according to claim 13, wherein the depth of focus of the multiple lens system is about 30 µm to about 150 µm.

15. The method according to claim 14, wherein the depth of focus is about 50 µm.

16. The method according to claim 11, comprising laser texturing the upper surface to form a plurality of protrusions extending above the upper surface to a height of about 75 Å to about 300 Å and having a substantially circular rim, with a diameter of about 3 µm to about 15 µm, around a central hole extending into the upper surface.

17. The method according to claim 16, wherein the rim has a radius of curvature of about 5 µm to about 200 µm.

18. The method according to claim 16, wherein the rim diameter is about 5 µm to about 8 µm.

19. The method according to claim 16, wherein the rim height is about 150 Å to about 225 Å.

20. The method according to claim 17, wherein the radius of curvature is about 40 µm to about 70 µm.

21. The method according to claim 16, wherein the ratio of the distance the central hole extends into the substrate to the rim height is less than about 1:1 to less than about 3:1.

22. The method according to claim 11, wherein the crystal material comprises quartz or calcite.

23. The method according to claim 11, further comprising:
depositing an underlayer on the textured upper surface of the substrate;
depositing a magnetic layer on the underlayer;
depositing a protective layer on the magnetic layer; and
depositing a lubricant topcoat on the protective layer, wherein the textured upper surface is substantially replicated on the subsequently deposited layers.

24. The method according to claim 1, further comprising rotating the substrate during laser texturing.

25. A method of manufacturing a magnetic recording medium having a plurality of sequentially formed layers on a non-magnetic substrate, which method comprises:
providing an upper surface of a layer of a magnetic recording medium with a texture by passing a pulsed laser light beam through a lens focusing system and then through a crystal spaced apart and positioned between the lens focusing system and the upper surface of one of the layers, so that the pulsed laser light beam passing through the crystal has an energy profile exhibiting at least two energy peaks, thereby forming two focus points on the upper surface of the layer.

26. The method according to claim 25, comprising exposing the upper surface to a pulsed laser light beam through a multiple lens focusing system containing a first lens and a second lens spaced apart from and positioned between the first lens and the crystal.

27. The method according to claim 26, comprising: texturing an upper surface of an underlayer; and depositing a magnetic layer on the textured underlayer.

28. The method according to claim 26, comprising texturing an upper surface of a magnetic layer.

\* \* \* \* \*